US006530360B1

(12) United States Patent
Kondo

(10) Patent No.: US 6,530,360 B1
(45) Date of Patent: Mar. 11, 2003

(54) ELECTRONIC CONTROL APPARATUS OF INTERNAL COMBUSTION ENGINE

(75) Inventor: Katsuhiko Kondo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 107 days.

(21) Appl. No.: 09/638,734

(22) Filed: Aug. 15, 2000

(30) Foreign Application Priority Data

Mar. 15, 2000 (JP) ........................................ 2000-071756

(51) Int. Cl.⁷ ................................................. F02P 5/00
(52) U.S. Cl. ........................... 123/406.27; 123/406.14; 123/406.25; 701/110
(58) Field of Search .......................... 123/54.4, 406.14, 123/406.27, 406.24, 406.25; 701/110

(56) References Cited

U.S. PATENT DOCUMENTS 5,706,783 A * 1/1998 Sawada ...................... 123/417
6,234,145 B1 * 6/2000 Shomura ............... 123/406.24

FOREIGN PATENT DOCUMENTS

| JP | 58-51155 | 11/1983 | ............. F02P/5/08 |
| JP | 3-18666 | 1/1991 | ............. F02P/5/15 |

* cited by examiner

Primary Examiner—Gene Mancene
Assistant Examiner—Johnny H. Hoang
(74) Attorney, Agent, or Firm—Sughrue Mion, PLLC

(57) ABSTRACT

Electronic control apparatus including a V-type multi-cylinder internal combustion engine having right and left banks of cylinders 1a and 1b, a crank-angle detecting device 12 for a camshaft of one bank 1a and which outputs a rotational-angle signal, a cylinder determination device 14 for generating a determination signal of which cylinder is to be ignited, an intake-air volume measuring device 4 for measuring an intake-air volume, and an ECU 18 for inputting the intake-air volume, the rotational-angle signal and the cylinder determination signal to calculate a rotational speed and ignition timing. The electronic control apparatus is configured so that ECU 18 inputs the rotational-angle signal from the crank-angle detecting device 12 and predicts a signal period of the next time from a state of change in the signal period of the same bank and sets ignition timing of the next time based on this predicted result.

12 Claims, 6 Drawing Sheets

FIG. 2(a) CYLINDER DETERMINATION SIGNAL

FIG. 2(b) OUTPUT SIGNAL OF CRANK ANGLE SENSOR MOUNTED IN CAMSHAFT

FIG. 2(c) RELATIONSHIP BETWEEN DETECTION PERIOD OF CRANK ANGLE SENSOR AND ACTUAL PERIOD

FIG. 2(d) ACTUAL CRANK ANGLE POSITION

FIG. 2(e) OUTPUT SIGNAL OF MISFIRE DETECTION SENSOR MOUNTED IN CRANKSHAFT

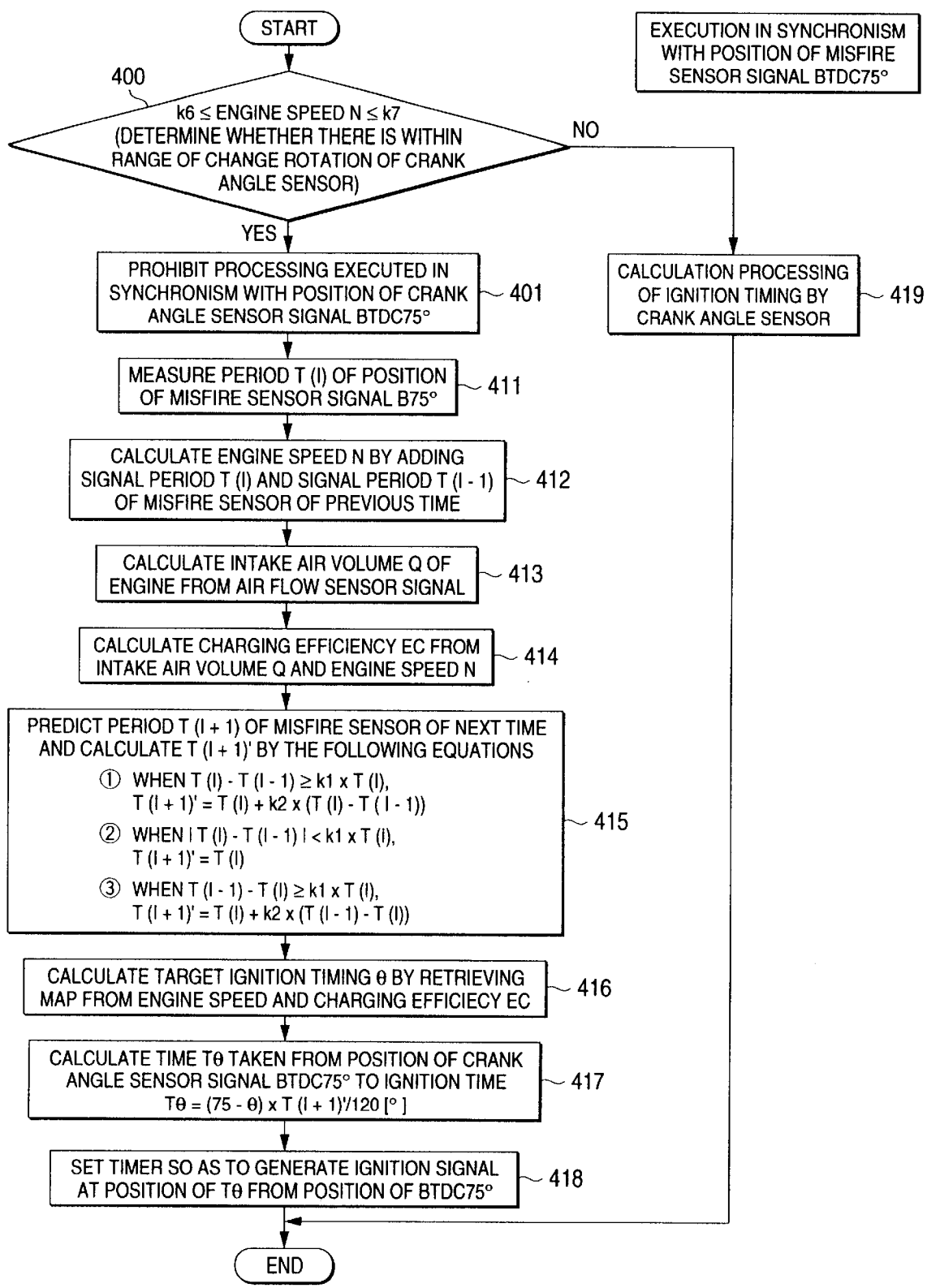

ELECTRONIC CONTROL APPARATUS OF INTERNAL COMBUSTION ENGINE

BACKGROUND OF THE INVENTION

This invention relates to an electronic control apparatus for controlling ignition timing of a V-type multi-cylinder internal combustion engine.

In a V-type multi-cylinder internal combustion engine, camshafts are respectively provided inside each cylinder head of right and left banks and each the camshaft is driven by a timing belt from a crankshaft, and also crank angle detecting means is provided in either one of the camshafts and ignition timing is controlled by a rotational angle signal of this crank angle detecting means. Since the timing belt has some looseness and has rotational resistance caused by reaction force of a valve spring to a lift of an intake valve or an exhaust valve applied to the camshafts, however, the crankshaft cannot rotate in perfect synchronism with the camshaft and a deviation occurs between the rotational angle signal of the crank angle detecting means and the actual rotational angle of the crankshaft due to variations in angular velocity in rotation of the camshaft, with the result that the ignition timing has deviated from normal ignition timing.

As a technique for correcting such a deviation of the ignition timing, one example is disclosed in the Unexamined Japanese Patent Application Publication no. Hei 3-18666. This technique notes that the ignition timing of the bank of the side in which the crank angle detecting means is provided delays to that of the bank of the other side, and is configured so that the crank angle detecting means determines whether there is ignition in either side and for the bank of the side in which the crank angle detecting means is not provided, the ignition timing is set by output of the crank angle detecting means and for the bank of the side in which the crank angle detecting means is provided, the ignition timing is corrected by a correction table map using a rotational speed and a advance angle correction value as parameters.

Also, a technique regarding correction of the ignition timing in case that variations have occurred in angular velocity of a camshaft is disclosed in the Examined Japanese Patent Application Publication No. Sho 58-51155 though the technique is not a case of an ignition apparatus for a V-type multi-cylinder internal combustion engine. This technique is configured so that when the ignition timing according to a rotational speed is set, the next signal period is calculated and predicted from the previous and this signal periods of crank angle detecting means and by calculating an angle from a first reference position signal placed in the maximum advance angle position, ignition at the calculated angle is set and also, a second reference position signal is provided in a top dead point position and in case that ignition by the calculation has delayed due to occurrence of sudden change in the angular velocity, ignition is forcedly performed by this second reference position signal and trouble caused by delay of the ignition timing is avoided.

In the conventional apparatus as described above, the former is that the correction table map is used to correct a deviation of ignition timing between the respective right and left banks. Since these is correction based on the ignition timing of one bank, the deviation of ignition timing between the banks can be corrected, but a deviation of an absolute angle between a camshaft and a crankshaft resulting from variations in angular velocity of the camshaft cannot be corrected and thus, it was difficult to obtain proper ignition timing to a rotational angle of the crankshaft. Also, since the latter technique predicts a difference between the previous and this signal periods of the crank angle detecting means as a difference between the next and this periods as it is, the deviation of the absolute angle between the camshaft and the crankshaft resulting from the variations in angular velocity of the camshaft cannot still be corrected, with the result that an error occurred in the next predicted period due to the deviation between the previous and this periods caused by the deviation of angle and a deviation of the ignition timing also occurred.

SUMMARY OF THE INVENTION

The invention is implemented to solve such problems, and it is an object of the invention to obtain an electronic control apparatus of an internal combustion engine for ignition timing control capable of controlling accurate ignition timing even in case that a difference in angle occurs between a crankshaft and a camshaft and an angle error occurs in output of crank angle detecting means in a V-type multi-cylinder internal combustion engine.

An electronic control apparatus of an internal combustion engine according to the invention comprises a V-type multi-cylinder internal combustion engine having right and left banks, crank angle detecting means which is provided in a camshaft of one of the right and left banks of this internal combustion engine and outputs a rotational angle signal, cylinder determination means for generating a determination signal of cylinders to be ignited of the internal combustion engine, intake air volume measuring means for measuring an intake air volume of the internal combustion engine, and an ECU for inputting at least the intake air volume, the rotational angle signal and the cylinder determination signal to calculate a rotational speed and ignition timing, and it is configured so that this ECU calculates a signal period from the rotational angle signal of the crank angle detecting means and predicts to calculate a signal period of the next time from a state of change in the signal period of the same bank and sets ignition timing of the next time based on this predicted result.

Also, the electronic control apparatus comprises a V-type multi-cylinder internal combustion engine having right and left banks, crank angle detecting means which is provided in a camshaft of one of the right and left banks of this internal combustion engine and outputs a rotational angle signal, cylinder determination means for generating a determination signal of cylinders to be ignited of the internal combustion engine, intake air volume measuring means for measuring an intake air volume of the internal combustion engine, and an ECU for inputting at least the intake air volume, the rotational angle signal and the cylinder determination signal to calculate a rotational speed and ignition timing, and it is configured so that this ECU calculates a signal period from the rotational angle signal of the crank angle detecting means and predicts to calculate a signal period of the next time of the other bank from a state of change in the signal period of one bank and the signal period of the previous time of the other bank and sets ignition timing based on this predicted result.

Further, map retrieval of a correction amount of a rotational angle signal position is performed by at least one of the rotational speed and charging efficiency calculated from the rotational speed and the intake air volume and the ignition timing is corrected by this correction amount.

Furthermore, a deviation of the signal period between the banks is calculated from the signal period of one bank and the signal period of the other bank and the correction amount is calculated from this deviation to correct the ignition timing.

In addition, a plurality of rotational speed ranges are set and the correction amount of the ignition timing is set every the rotational speed range.

Further, the electronic control apparatus comprises a V-type multi-cylinder internal combustion engine having right and left banks, crank angle detecting means which is provided in a camshaft of one of the right and left banks of this internal combustion engine and outputs a rotational angle signal, a misfire sensor which is provided in a crankshaft of the internal combustion engine and outputs a rotational angle signal, cylinder determination means for generating a determination signal of cylinders to be ignited of the internal combustion engine, intake air volume measuring means for measuring an intake air volume of the internal combustion engine, and an ECU for inputting at least the intake air volume, the rotational angle signal and the cylinder determination signal to calculate a rotational speed and ignition timing, and it is configured so that this ECU calculates a signal period from the rotational angle signal of the crank angle detecting means and predicts to calculate a signal period of the next time from a state of change in this signal period and sets ignition timing and also calculates a correction amount from a deviation between a rotational angle signal position obtained from the crank angle detecting means and a rotational angle signal position obtained from the misfire sensor and corrects the ignition timing by this correction amount.

Moreover, it is configured so that ignition is turned on according to a particular angle signal of the crank angle detecting means when it is determined that change in the signal period corresponding to each the bank exceeds a predetermined value from the calculated result of the signal period.

Also, the electronic control apparatus comprises a V-type multi-cylinder internal combustion engine having right and left banks, crank angle detecting means which is provided in a camshaft of one of the right and left banks of this internal combustion engine and outputs a rotational angle signal, a misfire sensor which is provided in a crankshaft of the internal combustion engine and outputs a rotational angle signal, cylinder determination means for generating a determination signal of cylinders to be ignited of the internal combustion engine, intake air volume measuring means for measuring an intake air volume of the internal combustion engine, and an ECU for inputting at least the intake air volume, the rotational angle signal and the cylinder determination signal to calculate a rotational speed and ignition timing, and it is configured so that this ECU calculates a signal period from the rotational angle signal of the crank angle detecting means and predicts to calculate a signal period of the next time from a state of change in this signal period and also stores a rotation area in which change in the rotational angle signal by the crank angle detecting means becomes large and predicts to calculate a signal period of the next time from a state of change in the signal period by the rotational angle signal of the misfire sensor within this rotation area and sets ignition timing of the next time based on these predicted results.

Further, the rotational speed for deciding the ignition timing is calculated from a plurality of signal periods.

BRIEF DESCRIPTION OF THE DRAWINGS

FIG. 6 is a flowchart for operation illustration of an electronic control apparatus of an internal combustion engine of a fourth embodiment according to the invention.

DETAILED DESCRIPTION OF THE PREFERRED EMBODIMENTS (First Embodiment)

Figure 1:
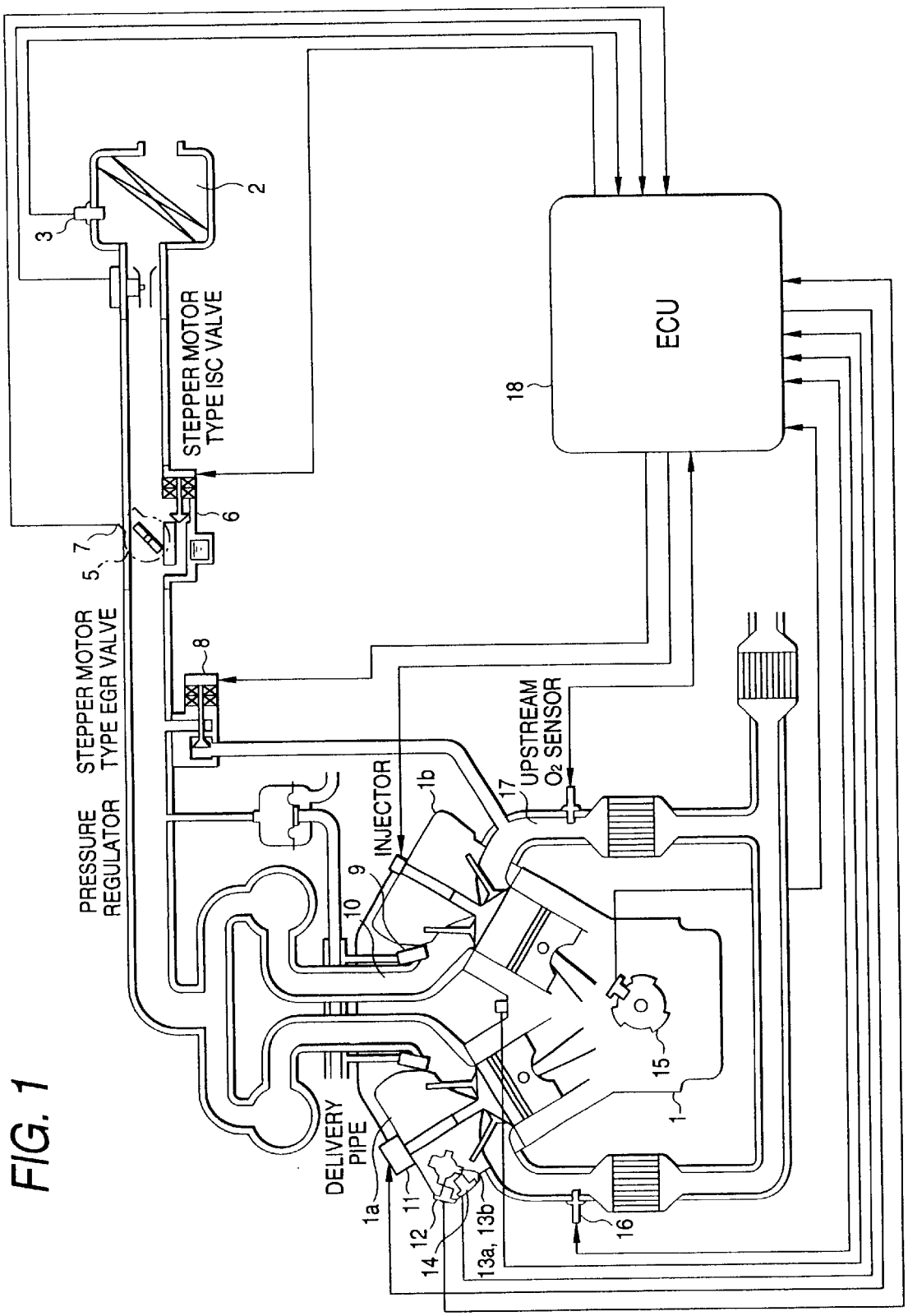
FIG. 1 is a configuration diagram illustrating an electronic control apparatus of an internal combustion engine of a first embodiment according to this invention.
Figure 2:
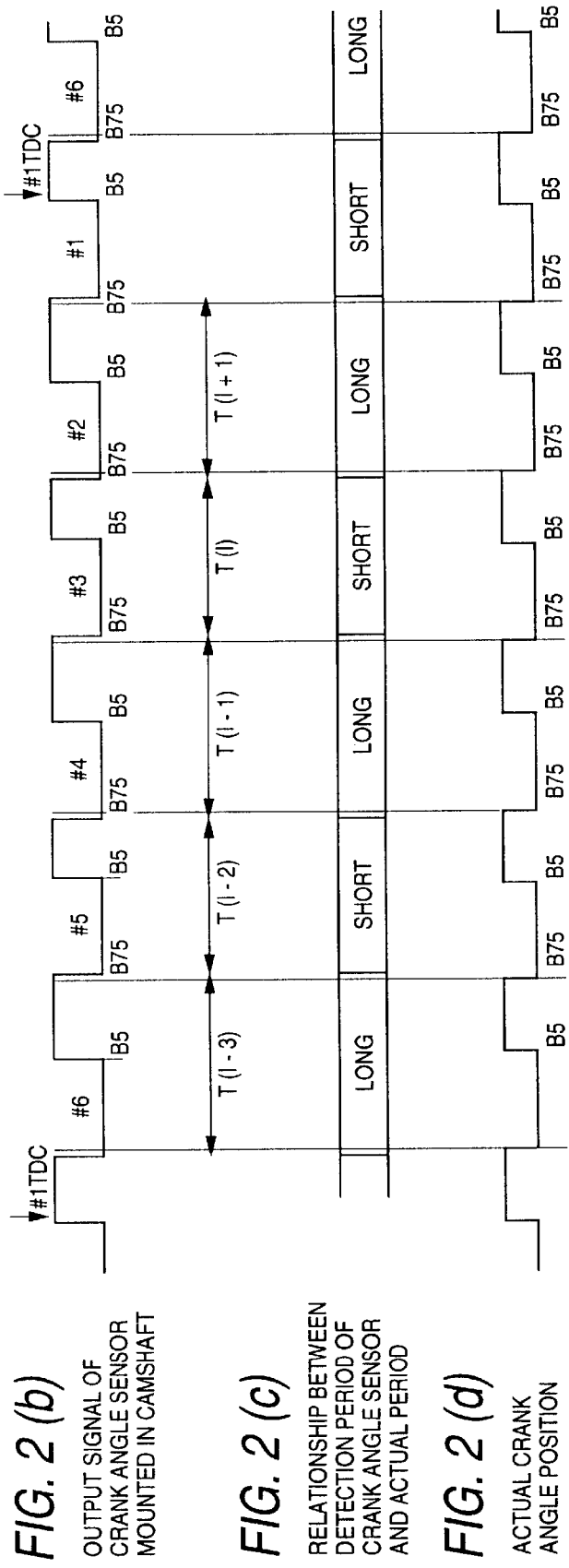
FIGS. 2(a) to 2(e) are time chart illustrating the electronic control apparatus of the internal combustion engine of the first embodiment according to the invention.
Figure 3:
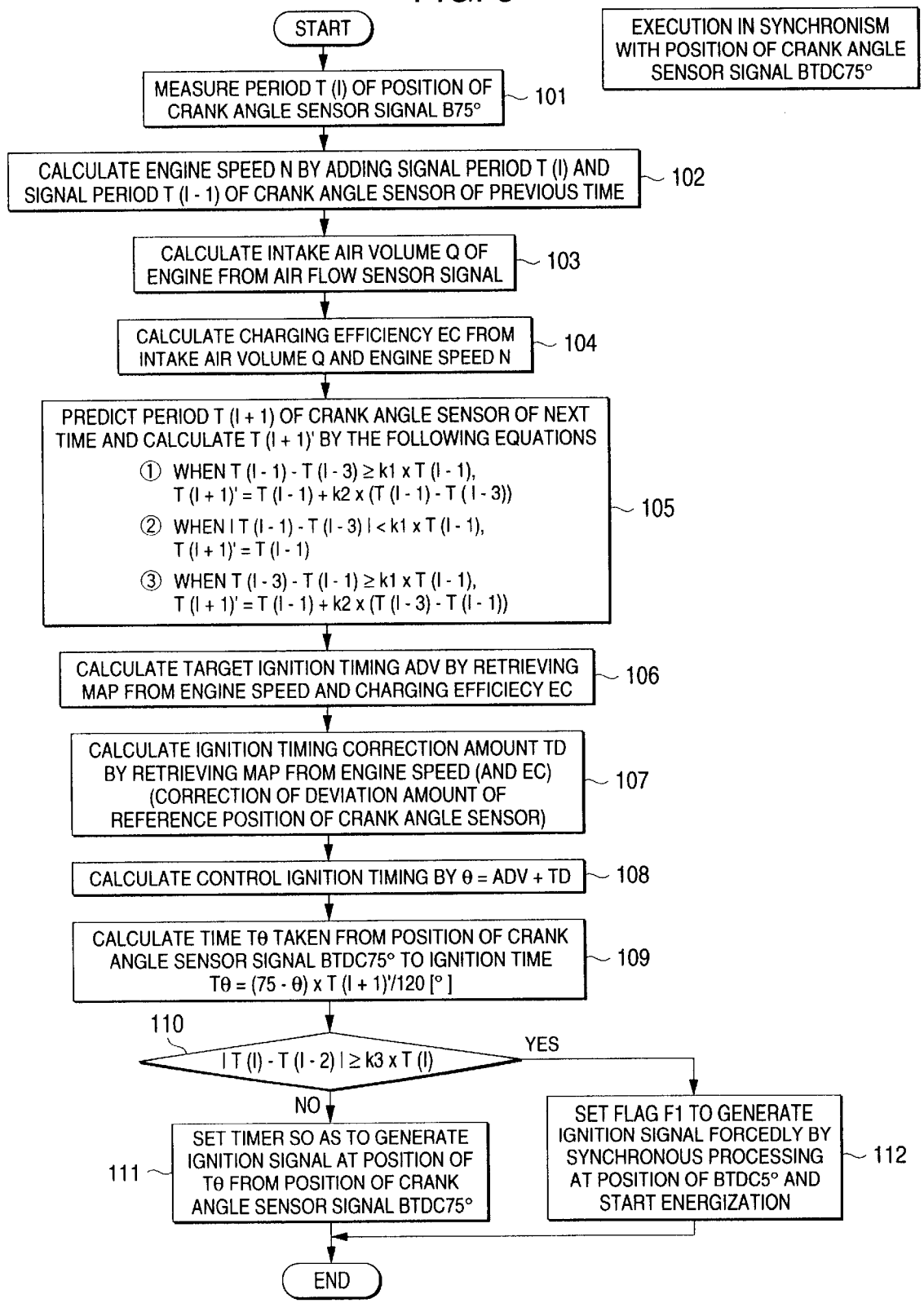
FIG. 3 is a flowchart for operation illustration of the electronic control apparatus of the internal combustion engine of the first embodiment according to the invention.

FIGS. 1 to 3 illustrate an electronic control apparatus of an internal combustion engine of a first embodiment according to this invention, and FIG. 1 is a system configuration diagram of the internal combustion engine, and FIGS. 2A to 2E are time chart for operation illustration, and FIG. 3 is a flowchart for operation illustration, and these configuration and operation show the case of a V-type six-cylinder internal combustion engine as one example.

In FIG. 1, numeral 1 is a V-type multi-cylinder internal combustion engine consisting of a left bank 1a and a right bank 1b, and numeral 2 is an air cleaner having an intake air temperature sensor 3, and numeral 4 is intake air volume measuring means such as an air flow sensor for measuring the intake air volume, and numeral 5 is a throttle body having an idle rotation control valve (ISC valve) 6 and a throttle sensor 7, and numeral 8 is an EGR valve, and numeral 9 is a fuel injection valve provided in an intake pipe 10, and numeral 11 is an ignition coil connected to an ignition plug (not shown), and numeral 12 is crank angle detecting means (crank angle sensor) for detecting a position of teeth provided in a rotor 13a for crank angle detection provided in a camshaft of the left bank 1a of the internal combustion engine 1, for example, and numeral 14 is a cylinder determination sensor for detecting a position of teeth provided in a rotor 13b for cylinder determination, and numeral 15 is a misfire sensor which is provided in a crankshaft of the internal combustion engine 1 and detects a rotational angle of the crankshaft to detect misfire by variation in the rotational angle, and numeral 16 is an $O_2$ sensor provided in an exhaust pipe 17, and numeral 18 is an ECU for controlling the internal combustion engine 1 by inputting signals from these sensors.

In the electronic control apparatus of the internal combustion engine having such a configuration, as shown in (b) of FIG. 2, the crank angle detecting means 12 generates position signals of, for example, a signal B75 of 75° before the top dead point and a signal B5 of 5° before the top dead point of each the cylinder as a reference position signal, and the signal B5 is set so as to determine the cylinder to be ignited from both of logic along with a cylinder determination signal shown in (a) of FIG. 2. Also, (e) of FIG. 2 is a rotational angle signal pulse of the crankshaft obtained from the misfire sensor 15, and (d) of FIG. 2 shows an actual rotational angle of the crankshaft compared with the signal of the crank angle detecting means 12 shown in (b) of FIG. 2, and a difference in angle occurs between the signal of the crank angle detecting means 12 shown in (b) of FIG. 2 and the actual rotational angle shown in (d) of FIG. 2 of the crankshaft because a variation in angular velocity occurs in the camshaft as described above.

A state of this difference in angle is shown in (c) of FIG. 2, a long or short difference in time occurs between T(I−3), T(I−1), T(I+1) which are periods of one bank and T(I−2), T(I) which are periods of the other bank, and the position signals of the reference position signals B75 and B5 of measuring periods by the crank angle detecting means 12 deviate from actual crank positions. Thus, a difference in angle also occurs between ignition timing determined by the reference position signals and original ignition timing, and one bank advances and the other bank delays. Incidentally, FIG. 2 and the following operation description, T(I) shows a measuring period of this time and T(I−1) shows a measuring period of the previous time and T(J−2) shows a measuring period of two times before and T(I−3) shows a measuring period of three times before and T(I+1) shows a measuring period of the next time, and each the period corresponds to a 120° rotational angle of the crankshaft for the six-cylinder internal combustion engine.

In the electronic control apparatus of the internal combustion engine of the first embodiment according to the invention, in relation to an error between the signal positions and the actual crank positions described above, the ECU 18 corrects ignition timing by operation as shown in a flowchart of FIG. 3. Also, this operation is performed based on the signal of the reference position B75. In the flowchart of FIG. 3, first, in step 101, the signal period T(I) of the reference position B75 of the crank angle detecting means 12 is measured and in step 102, a rotational speed N of the internal combustion engine is calculated from the signal period T(I) of this time and the signal period T(I−1) of the previous time. Next, in step 103, an intake air volume Q is calculated from a signal of the intake air volume measuring means 4 and in step 104, charging efficiency EC is calculated from the intake air volume Q and the rotational speed N of the internal combustion engine.

Then, the operation proceeds to step 105, a predicted value T(I+1)' of a signal period of the next time is calculated. That is, when a difference between the signal period T(I−1) of the previous time and the signal period T(I−3) of three times before is $T(I-1)-T(I-3) \geq k1 \times T(I-1)$ and the internal combustion engine is in a state of deceleration, calculation is made as $$T(I+1)'=T(I-1)+k2 \times (T(I-1)-T(I-3))$$

and also when $|T(I-1)-T(I-3)|<k1 \times T(I-1)$ and change in the rotational speed is less than or equal to a predetermined value, calculation is made as $$T(I+1)'=T(I-1)$$

and further when $T(I-3)-T(I-1) \geq k1 \times T(I-1)$ and the internal combustion engine is in a state of acceleration, calculation is made as $$T(I+1)'=T(I-1)-k2 \times (T(I-3)-T(I-1))$$

and thereby, prediction is made. Here, k1 and k2 are coefficients, and the signal periods of T(I−1), T(I−3) and T(I+1)' are the signal periods of the same bank in the V-type six-cylinder internal combustion engine.

Further, in step 106, a map is retrieved by values of the rotational speed N of the internal combustion engine and the charging efficiency EC to calculate target ignition timing (target advance angle amount) ADV and in step 107, by retrieval of the map previously stored from at least one of the rotational speed N and the charging efficiency EC, an ignition timing correction amount TD for correcting a deviation amount between the reference position signal B75 of the crank angle detecting means 12 and the actual crank position is read and calculated. Then, in step 108, ignition timing to be controlled is calculated as $$\theta = ADV + TD$$

and further, in step 109, time Tθ taken from a position of the reference position signal B75, namely BTDC75° to ignition is calculated as $$T\theta = (75° - \theta) \times T(I+1)'/120°.$$

Subsequently, in step 110, it is determined whether the following equation holds or not, $$|T(I)-T(I-2)| \geq k3 \times T(I)$$

and if not (NO), in step 111, a timer is set so as to generate an ignition signal Tθ after the position of BTDC75°, if so (YES), the operation proceeds to step 112 and a flag F1 is set so as to generate the ignition signal forcedly by the B5 signal of BTDC5° and energization of the ignition coil is started. Here, k3 is a coefficient.

In the calculations of the ignition position by the electronic control apparatus of the internal combustion engine of the first embodiment according to the invention as described above, in relation to the alternate difference between the left bank and the right bank in the signal period measured by the crank angle detecting means 12 as shown in FIG. 2, in step 105, the change amount is calculated from the signal periods of the previous time and two times before of the same bank and the signal period of the next time is predicted and further in step 107, the deviation amount of the reference position signal of the crank angle detecting means 12 is corrected from the value stored in the map, so that prediction of of the signal period with high accuracy can be made every bank and an angle error is also corrected to set the ignition timing. Also, in step 110, sudden change in the signal period in the same bank is detected and forced ignition is turned on at the B5 position in case that the sudden change in the signal period has occurred, so that the sudden change in the period can accurately be determined and large change in the ignition timing can be prevented. Further, since the target advance angle amount is set from the rotational speed and the charging efficiency, the proper ignition timing can be obtained.

(Second Embodiment)

Figure 4:
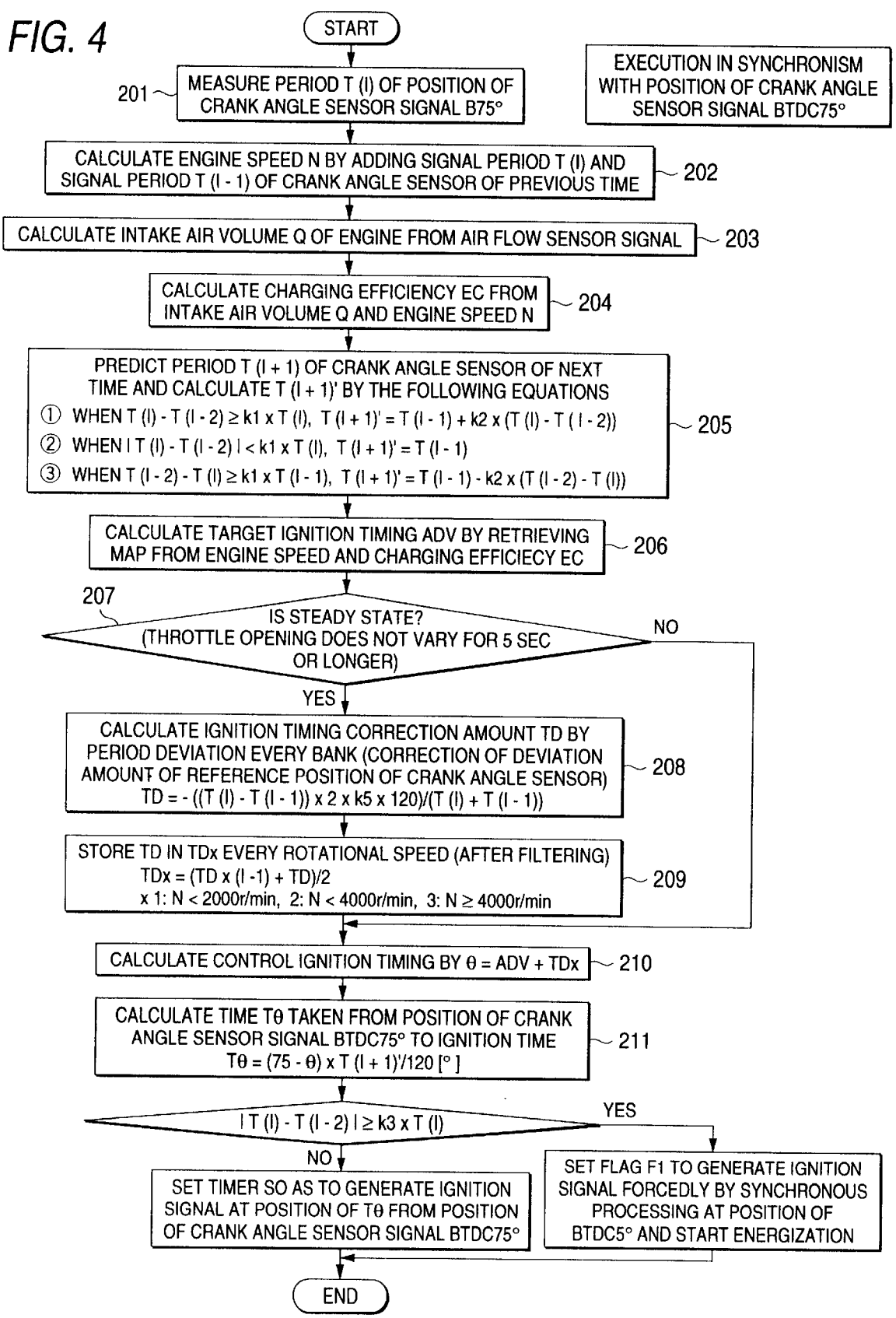
FIG. 4 is a flowchart for operation illustration of an electronic control apparatus of an internal combustion engine of a second embodiment according to the invention.

FIG. 4 is a flowchart for operation illustration of an electronic control apparatus of an internal combustion engine of a second embodiment according to the invention, and in this embodiment, the ECU 18 operates as follows. Incidentally, in the flowchart of FIG. 4, operations of steps 201 to 204 are identical to that of steps 101 to 104 of the first embodiment and the description will be omitted here.

In step 205, a predicted value T(I+1)' of a signal period of the next time is calculated as follows. That is, when $T(I)-T(I-2) \geq k1 \times T(I)$ and the internal combustion engine is in a state of deceleration, calculation is made as $$T(I+1)'=T(I-1)+k2 \times (T(I)-T(I-2))$$

and also when $|T(I)-T(I-2)|<k1 \times T(I)$ and change in the rotational speed is small, calculation is made as $$T(I+1)'=T(I-1)$$

and further when T(I−2)−T(I)≧k1×T(I−1) and the internal combustion engine is in a state of acceleration, prediction is made as $$T(I+1)'=T(I-1)-k2\times(T(I-2)-T(I)).$$

Here, the periods of T(I) and T(I−2) are the signal periods of the same bank, but both the periods and the predicted period T(I+1)' are the signal periods of the different bank. However, both the periods are the signal periods closest to the predicted period T(I+1)' in relation to time, and change in the signal period is detected from both the periods and is added to the signal period T(I−1) of the previous time of the same bank, prediction can be made with higher accuracy.

In step 206, as in the case of step 106 of the first embodiment, a map is retrieved by values of a rotational speed N of the internal combustion engine and charging efficiency EC to calculate target ignition timing (target advance angle amount) ADV and in step 207, it is determined whether a run is in a steady state or not by monitoring movement of the throttle sensor 7 and if so, in step 208, by a deviation of a signal period of the left bank from a signal period of the right bank, a correction amount TD of ignition timing is calculated as $$TD=((T(I)-T(I-1))\times 2\times k5\times 120)/(T(I)+T(I-1))$$

and in step 209, values every predetermined rotational speed zone of this TD are stored as TDx. Here, TDx is an average value of the previous value and TD as $$TDx=(TD(I-1)+TD)/2$$

and for example, classification is made as 2000 rpm or less, 4000 rpm or less, 4000 rpm or more and TDx is stored in different addresses.

Then, the operation proceeds to step 210 and in step 207, if it is determined that the run is not in a steady state since the movement of the throttle sensor 7 is predetermined movement or larger, the operation jumps from step 207 to step 210. In step 210, ignition timing to be controlled is calculated as $$\theta=ADV+TDx$$

and further, in step 211, time Tθ taken from a signal position of the reference position B75, namely BTDC75° to ignition is calculated as $$T\theta=(75°-\theta)\times T(I+1)'/120°.$$

Incidentally, processing of this step 211 is identical to that of step 109 of the first embodiment, and subsequent processing is also identical to that of the first embodiment.

In this embodiment as described above, in step 205, a deviation of the signal period of the other bank closer to the predicted period in relation to time is used and period prediction of the bank of an object of prediction is made, so that prediction accuracy can be improved. Also, in steps 208 and 209, a stable state of throttle manipulation is detected and the correction amount every rotational zone is set by the signal period difference between respective banks, so that a deviation between the banks can be corrected with high accuracy and as in the case of the first embodiment, ignition timing with high accuracy can be set every bank and large change in ignition timing can be also prevented even for sudden change of the period.

(Third Embodiment)

Figure 5:
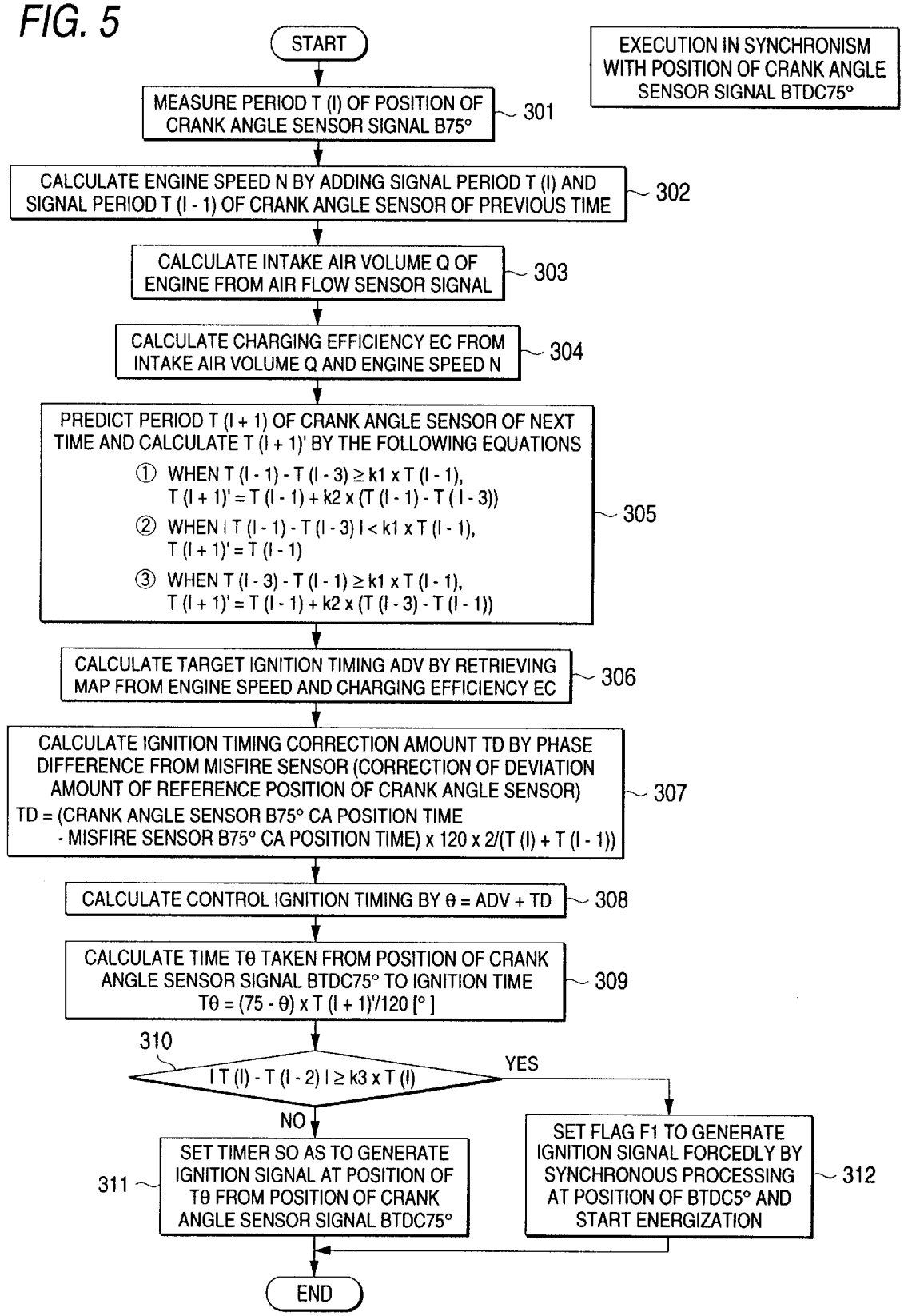
FIG. 5 is a flowchart for operation illustration of an electronic control apparatus of an internal combustion engine of a third embodiment according to the invention.

FIG. 5 is a flowchart for operation illustration of an electronic control apparatus of an internal combustion engine of a third embodiment according to the invention, and the difference between the control contents of the third embodiment and the control contents of the first embodiment is in only a method of calculating a correction amount of ignition timing in step 307. Referring to the contents in sequence below, in step 301, a signal period T(I) of B75 outputted by the crank angle detecting means 12 is measured and in step 302, a rotational speed N is calculated from a measured value T(I) of this time and a measured value T(I−1) of the previous time of this signal period. In step 303, an intake air volume Q is calculated from a signal of the intake air volume measuring means 4 and in step 304, charging efficiency EC is calculated from the intake air volume Q and the rotational speed N of the internal combustion engine.

In step 305, a predicted value T(I+1)' of a signal period of the next time is calculated and the description will be omitted since the calculation contents are identical to that of step 105 of the first embodiment. In step 306, target ignition timing ADV is calculated from a map by values of the rotational speed N and the charging efficiency EC. In step 307, a correction amount of ignition timing is set and this setting is performed as follows. That is, assuming that signal occurrence timing of BTDC75° outputted by the crank angle detecting means 12 is B75 and occurrence timing of a position signal corresponding to the BTDC75° among angle signals outputted by the misfire sensor 15 is B75', the correction amount TD of ignition timing is calculated as $$TD=(B75-B75')\times 120\times 2/(T(I)+T(I-1)).$$

That is, the angle deviation amount between B75 and B75' in relation to the signal period from the crank angle detecting means 12 is obtained as the correction amount TD of ignition timing.

In step 308, control ignition timing is calculated as $$\theta=ADV+TD$$

and in step 309, time Tθ taken from a signal position of the reference position signal B75 to ignition is calculated as $$T\theta=(75°-\theta)\times T(I+1)'/120°.$$

Further in step 310, it is determined whether the following equation holds or not, $$|T(I)-T(I-2)|\geq k3\times T(I)$$

and if not (NO), in step 311, a timer is set so as to generate an ignition signal Tθ after the position of BTDC75°, if so (YES), the operation proceeds to step 312 and a flag F1 is set so as to generate the ignition signal forcedly by the B5 signal of BTDC5° and energization is started.

In the electronic control apparatus of the internal combustion engine of the third embodiment as described above, in step 307, the ignition timing is corrected on the basis of the angle deviation between the signal of the crank angle detecting means 12 and the angle signal outputted by the misfire sensor 15 provided in the crankshaft, so that an error every bank of the signal position outputted by the crank angle detecting means 12 and an error resulting from change in angular velocity of the camshaft can be corrected and also, effects similar to the case of the first embodiment can be obtained.

(Fourth Embodiment)

FIG. 6 is a flowchart for illustrating operation of an electronic control apparatus of an internal combustion engine of a fourth embodiment according to the invention and in this embodiment, prediction of ignition timing is made as follows. First, in step 400, it is determined whether a rotational speed of the internal combustion engine is within the range between k6 and k7 of predetermined values or not. These predetermined values k6 and k7 are set to a run zone in which change in angular velocity of the camshaft increases and an error of a signal of the crank angle detecting means 12 to an actual crank position increases. If this determination is NO, prediction of ignition timing by output of the crank angle detecting means 12 can be made and the operation proceeds to step 419 in order to perform processing of the first embodiment described above.

If the determination of step 400 is YES, in step 401, prediction processing of ignition timing by the crank angle detecting means 12 is prohibited, and the operation proceeds to step 411 and starts processing based on a rotational angle signal outputted by the misfire sensor 15. The description of this processing of step 411 to step 414 will be omitted since the difference between the processing of step 411 to step 414 and that of step 101 to step 104 of the first embodiment is in that the crank angle detecting means 12 is only replaced with the misfire sensor 15 in relation to rotational angle detecting means. Then, in step 415, a signal period of the next time by the misfire sensor 15 is predicted and calculated, and this calculation contents are as follows.

A predicted value T(I+1)' is predicted as follows. When a relationship between this period T(I) and the previous period T(I−1) is T(I)−T(I−1)≧k1×T(I) and the internal combustion engine is in a state of deceleration, calculation is made as $$T(I+1)'=T(I)+k2 \times (T(I)-T(I-1))$$

and when |T(I)−T(I−1)|<k1×T(I) and change in the rotational speed is less than or equal to a predetermined value, calculation is made as $$T(I+1)'=T(I)$$

and when T(I−1)−T(I)≧k1×T(I) and the internal combustion engine is in a state of acceleration, calculation is made as $$T(I+1)'=T(I)-k2\times(T(I-1)-T(I)).$$

Here, the period detection is performed by the misfire sensor 15, so that there is no error between the banks and the period between different banks can be used to make prediction.

Subsequently, in step 416, a map is retrieved by values of the rotational speed N of the internal combustion engine and the charging efficiency EC to calculate target ignition timing (target advance angle amount) θ and in step 417, time Tθ from a signal B75 corresponding to θ is calculated as $$T\theta=(75-\theta)\times T(I+1)'/120°$$

and in step 418, a timer by this time Tθ is set so as to generate an ignition signal Tθ after the signal B75.

In the electronic control apparatus of the internal combustion engine of the fourth embodiment as described above, the signal period is predicted to generate the ignition signal by the angle signal of the misfire sensor 15 in relation to the run zone in which change in angular velocity of the camshaft increases and an error of a signal of the crank angle detecting means 12 to an actual crank position increases, so that ignition in a position adapted for the rotational speed of the internal combustion engine can always be made without being affected by the angle error of the crank angle detecting means 12.

According to the invention as described above, in a V-type internal combustion engine with a left bank and a right bank having different signal periods measured by crank angle detecting means, in relation to the signal period of the previous time of the bank of a prediction object, a signal period of the next time is predicted and calculated from a state of change in the signal periods of the previous time and two times before of the same bank of either side and a deviation amount from an actual angle is also corrected by a map and also, a correction amount of ignition timing is set every rotational zone from a deviation between the banks at an stable period of throttle operation and further, ignition timing is corrected on the basis of an angle signal of a misfire sensor provided in a crankshaft or prediction of the signal period is made by the angle signal of the misfire sensor in a run zone with a large change in rotation, so that an excellent electronic control apparatus of the internal combustion engine capable of always controlling accurate ignition timing can be obtained even in case that change in angular velocity occurs in an output signal of the crank angle detecting means or an angle error due to the deviation between the banks occurs.

What is claimed is:

1. An electronic control apparatus of an internal combustion engine comprising:

a multi-cylinder internal combustion engine having right and left banks of cylinders arranged in a V, crank angle detecting means which is provided at a camshaft of one of the right and left banks of said internal combustion engine and outputs a rotational angle signal, cylinder determination means for generating a determination signal of cylinders to be ignited, intake air volume measuring means for measuring an intake air volume, and an ECU for inputting at least the intake air volume, the rotational angle signal and the cylinder determination signal to calculate a rotational speed and ignition timing, wherein said ECU calculates a signal period from the rotational angle signal of said crank angle detecting means and calculates a predicted signal period of a next ignition timing from a rate of change in the signal period of the same bank and sets the next ignition timing based on the predicted result.

2. An electronic control apparatus of an internal combustion engine comprising:

a multi-cylinder internal combustion engine having right and left banks of cylinders arranged in a V, crank angle detecting means which is provided at a camshaft of one of the right and left banks of said internal combustion engine and outputs a rotational angle signal, cylinder determination means for generating a determination signal of cylinders to be ignited, intake air volume measuring means for measuring an intake air volume, and an ECU for inputting at least the intake air volume, the rotational angle signal and the cylinder determination signal to calculate a rotational speed and ignition timing, wherein said ECU calculates a signal period from the rotational angle signal of said crank angle detecting means and calculates a predicted signal period of a next ignition timing of the other bank from a rate of change in the signal period of one bank and the signal period of a previous ignition timing of the other bank and sets ignition timing based on the predicted result.

3. An electronic control apparatus of an internal combustion engine comprising:
a multi-cylinder internal combustion engine having right and left banks of cylinders arranged in a V,
crank angle detecting means which is provided at a camshaft of one of the right and left banks of said internal combustion engine and outputs a rotational angle signal,
cylinder detemination means for generating a determinationsignal of cylinders to be ignited,
intake air volume measuring meands for measuring an intake air volume, and
an ECU for inputting at least tghe intake air volume, the rotational angle signal and the cylinder determination signal to calculate a rotational speed and ingnition timing,
wherein said ECU retrieves and ignition timing correction amount from a map stored in said ECU, and further wherein said ignition timing correction amount is determined by at least one of the rotational speed and charging efficiency, wherein said chargiing efficiency is calculated from the rotational speed and the intake air volume, and the ignition timing is corrected by the correction amount.

4. An electronic control apparatus of an internal combustion engine comprising:
a multi-cylinder internal combustion engine having right and left banks of cylinders arranged in a V,
crank angle detecting means which is provided at a camshaft of one of the right and left banks of said internal combustion engine and outputs a rotational angle signal,
cylinder determination means for generating a determination signal of cylinders to be ignited,
intake air volume measuring means for measuring an intake air volume, and
an ECU for inputting at least the intake air volume, the rotational angle signal and the cylinder determination signal to calculate a rotational speed and ignition timing,
wherein a deviation of a crank angle signal period between the banks is calculated from a crank angle signal period of one bank and a crank angle signal period of the other bank and the correction amount is calculated from the deviation to correct the ignition timing.

5. An electronic control apparatus of an internal combustion engine comprising:
a multi-cylinder internal combustion engine having right and left banks of cylinders arranged in a V,
crank angle detecting means which is provided at a camshaft of one of the right and left banks of said internal combustion engine and outputs a rotational angle signal,
cylinder determination means for generating a determination signal of cylinders to be ignited,
intake air volume measuring means for measuring an intake air volume, and
an ECU for inputting at least the intake air volume, the rotational angle signal and the cylinder determination signal to calculate a rotational speed and ignition timing,
wherein a plurality of rotational speed ranges are set and a correction amount of the ignition timing is determined according to one of said rotational speed ranges that corresponds to said rotational speed calculated by said ECU.

6. An electronic control apparatus of an internal combustion engine comprising:
a multi-cylinder internal combustion engine having right and left banks of cylinders arranged in a V,
crank angle detecting means which is provided at a camshaft of one of the right and left banks of said internal combustion engine and outputs a rotational angle signal,
cylinder determination means for generating a determination signal of cylinders to be ignited,
intake air volume measuring means for measuring an intake air volume, and
an ECU for inputting at least the intake air volume, the rotational angle signal and the cylinder determination signal to calculate a rotational speed and ignition timing,
wherein cylinders are ignited at a particular angle signal of said crank angle detecting means when it is determined that change in a rotational angle signal period corresponding to each bank exceeds a predetermined value.

7. An electronic control apparatus of an internal combustion engine comprising:
a multi-cylinder internal combustion engine having right and left banks of cylinders arranged in a V,
crank angle detecting means which is provided at a camshaft of one of the right and left banks of said internal combustion engine and outputs a rotational angle signal,
cylinder determination means for generating a determination signal of cylinders to be ignited,
intake air volume measuring means for measuring an intake air volume, and
an ECU for inputting at least the intake air volume, the rotational angle signal and the cylinder determination signal to calculate a rotational speed and ignition timing,
wherein the ECU calculates rotational speed, for deciding the ignition timing, using the rotational angle signal from a plurality of signal periods of said crank angle detecting means.

8. An electronic control apparatus of an internal combustion engine, comprising:
a multi-cylinder internal combustion engine having right and left banks of cylinders arranged in a V,
crank angle detecting means which is provided at a camshaft of one of the right and left banks of said internal combustion engine and outputs a rotational angle signal,
a misfire sensor which is provided at a crankshaft of said internal combustion engine and outputs a rotational angle signal,
cylinder determination means for generating a determination signal of cylinders to be ignited,
intake air volume measuring means for measuring an intake air volume, and
an ECU for inputting at least the intake air volume, the rotational angle signal and the cylinder determination signal to calculate a rotational speed and ignition timing, wherein
said ECU calculates a signal period from the rotational angle signal of said crank angle detecting means, and calculates a predicted signal period of a next ignition timing from a rate of change in the signal period, and sets ignition timing, and also calculates a correction amount from a deviation between a rotational angle signal position obtained from said crank angle detecting means and a rotational angle signal position obtained from said misfire sensor, and corrects the ignition timing by the correction amount.

9. The electronic control apparatus of an internal combustion engine as defined in claim 8, wherein cylinders are ignited according to a particular angle signal, of said crank angle detecting means, when it is determined that change in the signal period corresponding to each bank exceeds a predetermined value.

10. The electronic control apparatus of an internal combustion engine as defined in claim 8, wherein the rotational speed for deciding the ignition timing is calculated from a plurality of signal periods.

11. An electronic control apparatus of an internal combustion engine, comprising:

a multi-cylinder internal combustion engine having right and left banks of cylinders arranged in a V, crank angle detecting means which is provided at a camshaft of one of the right and left banks of said internal combustion engine and outputs a rotational angle signal, a misfire sensor which is provided at a crankshaft of said internal combustion engine and outputs a rotational angle signal, cylinder determination means for generating a determination signal of cylinders to be ignited, intake air volume measuring means for measuring an intake air volume, and an ECU for inputting at least the intake air volume, the rotational angle signal and the cylinder determination signal to calculate a rotational speed and ignition timing, wherein said ECU calculates a signal period from the rotational angle signal of said crank angle detecting means, and calculates a predicted signal period of a next ignition timing from a state of change in the signal period, and also stores values for which change in the rotational angle signal by said crank angle detecting means becomes large, and calculates a predicted signal period of the next ignition timing from a rate of change in the signal period using the rotational angle signal of said misfire sensor when a change in the rotational angle signal by said crank angle detection means is large, and sets the next ignition timing based on the predicted results.

12. The electronic control apparatus of an internal combustion engine as defined in claim 11, wherein the rotational speed for deciding the ignition timing is calculated from a plurality of signal periods.

* * * * *